United States Patent [19]

Hefner, Jr.

[11] Patent Number: 4,731,426
[45] Date of Patent: Mar. 15, 1988

[54] POLYMERIZATION PRODUCT FROM CYANATE FUNCTIONAL MALEIMIDE

[75] Inventor: Robert E. Hefner, Jr., Lake Jackson, Tex.

[73] Assignee: The Dow Chemical Company, Midland, Mich.

[21] Appl. No.: 27,774

[22] Filed: Mar. 18, 1987

Related U.S. Application Data

[62] Division of Ser. No. 782,644, Oct. 1, 1985, Pat. No. 4,683,276.

[51] Int. Cl.$^4$ .............................................. C08F 22/40
[52] U.S. Cl. ..................................... 526/262; 528/322
[58] Field of Search ......................... 526/262; 528/322

[56] References Cited

U.S. PATENT DOCUMENTS 4,110,364  8/1978  Gaku et al. ......................... 528/170
4,371,689  2/1983  Gaku et al. ......................... 528/162
4,396,745  8/1983  Ikeguchi ............................. 525/374
4,683,276  7/1987  Hefner ............................... 528/322

OTHER PUBLICATIONS

*BT RESIN* (a technical bulletin by Mitsubishi Gas Chemical Company, Inc.), Oct. 1, 1981.

*Primary Examiner*—Harold D. Anderson

[57] ABSTRACT

Thermoset products are prepared by polymerizing (A) at least one thermosettable compound which contains both a maleimide group and a cyanate group such as 3-(2,5-dihydro-2,5-dioxo-1H-pyrrol-1-yl)phenyl cyanate and optionally (B) at least one of (1) at least one aromatic polycyanate such as bisphenol A dicyanate; (2) at least one polymaleimide such as N,N'-(methylenedi-p-phenylene)bismaleimide; (3) at least one material having an average of more than one vicinal epoxide group per molecule such as diglycidyl ether of bisphenol A; (4) at least one polymerizable ethylenically unsaturated material such as styrene; or (5) a mixture of any two or more of components 1-4 in any combination.

4 Claims, No Drawings

POLYMERIZATION PRODUCT FROM CYANATE FUNCTIONAL MALEIMIDE

CROSS-REFERENCE TO RELATED APPLICATION

This is a divisional, of application Ser. No. 782,644, filed Oct. 1, 1985, now U.S. Pat. No. 4,683,276.

BACKGROUND OF THE INVENTION

This invention pertains to thermosettable compositions which simultaneously contain both a maleimide group and a cyanate group.

Aromatic polycyanates which are thermosettable to polytriazines are known, for example, from U.S. Pat. Nos. 3,448,079; 3,553,244; 3,694,410; 3,740,348; 3,755,402; 4,094,852 and 4,097,455. Said polytriazines possess excellent heat resistance, however, an improvement in their mechanical properties, especially tensile strength and elongation would be desirable. Furthermore, there is substantial room for improvement in the moisture resistance of said polytriazines.

Polymaleimides which are thermosettable are known, for example, from U.S. Pat. No. 2,444,536 and from *New Industrial Polymers*, Rudolph D. Deanin (editor), ACS Symposium Series 4 published by American Chemical Society, Washington, D.C. (1972), pages 100–123. Said polymaleimides are typically difficult to process and cure due to high melting points, poor solvent solubility and slow curing rates. The thermoset (cured) polymaleimides are very brittle and thus of limited utility.

Copolymerization products of compounds containing two or more maleimide groups with compounds containing two or more cyanate groups are also known, for example, from Proc. Electr./Electron. Insul. Conf., 1981, 15th, pages 168–171. Representative of said copolymerization products is the bismaleimide-triazine resin prepared by copolymerization of bisphenol A dicyanate and N,N'-(methylenedi-p-phenylene)bismaleimide. Preparation of said copolymerization products always requires premixing or contacting together two separate components: the polycyanate compound and the polymaleimide compound.

The present invention provides novel compositions which simultaneously contain both a maleimide group and a cyanate group. Said compositions are thermosettable to useful polymeric (cured) compositions including castings, laminates, coatings and the like. Many of the compositions of the present invention possess improved mechanical properties and improved moisture resistance when compared to the polytriazines of the prior art. In addition, improved processability is inherent to the compositions of the present invention.

SUMMARY OF THE INVENTION

One aspect of the invention concerns a composition which comprises at least one thermosettable compound which simultaneously contains both a maleimide group and a cyanate group.

Another aspect of the present invention concerns the product resulting from polymerizing the aforesaid composition.

A further aspect of the present invention concerns a composition which comprises (A) at least one thermosettable compound which simultaneously contains both a maleimide group and (B) at least one of
 (1) at least one aromatic polycyanate;
 (2) at least one polymaleimide;
 (3) at least one material having an average of more than one vicinal epoxide group per molecule; or
 (4) at least one polymerizable ethylenically unsaturated material;

wherein component (A) comprises from about 1 to about 99, preferably from about 1 to about 75, most preferably from about 5 to about 50 percent by weight of the combined weight of components (A) and (B).

An additional aspect of the present invention concerns the product resulting from copolymerizing the aforementioned composition.

DETAILED DESCRIPTION OF THE INVENTION

Suitable compositions which simultaneously contain both a maleimide group and a cyanate group include, for example, those represented by the formulas

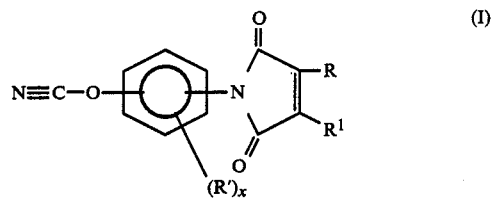

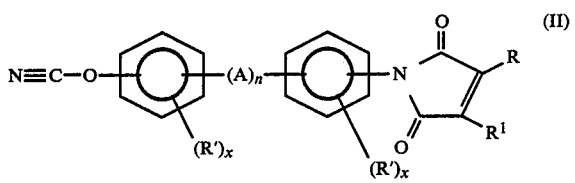

wherein each R and $R^1$ is independently hydrogen or a hydrocarbyl group having from 1 to about 3 carbon atoms; each R' is independently hydrogen, a hydrocarbyl or hydrocarbyloxy group having from 1 to about 10, preferably from 1 to about 4 carbon atoms, halogen, preferably chlorine or bromine; A is a divalent hydrocarbon group having from 1 to about 10, preferably from 1 to about 4 carbon atoms, —O—,

—S—, —S—S—,

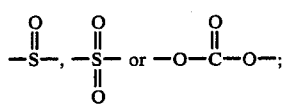

n has a value of zero or 1 and x has a value of 4.

The term hydrocarbyl as employed herein means any aliphatic, cycloaliphatic, aromatic, aryl substituted aliphatic or aliphatic substituted aromatic groups. Likewise, the term hydrocarbyloxy group means hydrocarbyl group having an oxygen linkage between it and the object to which it is attached.

Particularly suitable compositions which simultaneously contain both a maleimide group and a cyanate group include, for example, 4-(1-(3-(2,5-dihydro-2,5-dioxo-1H-pyrrol-1-yl)phenyl)-1-methylethyl)phenyl cyanate; 4-(1-(4-(2,5-dihydro-2,5-dioxo-1H-pyrrol-1-yl)phenyl)-1-methylethyl)phenyl cyanate; 4-(1-(4-(2,5-dihydro-2,5-dioxo-1H-pyrrol-1-yl)phenyl)ethyl)phenyl cyanate; 4-(4-(2,5-dihydro-2,5-dioxo-1H-pyrrol-1-yl)phenoxy)phenyl cyanate; 4-((4-(2,5-dihydro-2,5-dioxo-1H-pyrrol-1-yl)thio)phenyl cyanate; 4-(4-(2,5-dihydro-2,5-dioxo-1yl)benzoyl)phenyl cyanate; 4-((4-(2,5-dihydro-2,5-dioxo-1H-pyrrol-1-yl)phenyl)sulfonyl)phenyl cyanate; 4-(1-(4-(2,5-dihydro-3-methyl-2,5-dioxo-1H-pyrrol-1-yl)-1-methylethyl)phenyl cyanate; 2,6-dibromo-4-(1-(3,5-dibromo-4-(2,5-dihydro-2,5-dihydro-2,5-dioxo-1H-pyrrol-1-yl)phenyl)-1-methylethyl)phenyl cyanate; 4-(2,5-dihydro-2,5-dioxo-1H-pyrrol-1-yl)-3-methylphenyl cyanate; 4-(2,5-dihydro-2,5-dioxo-1H-pyrrol-1-yl)phenyl cyanate and 3-(2,5-dihydro-2,5-dioxo-1H-pyarol-1-yl)phenyl cyanate.

The compositions which simultaneously contain both a maleimide group and a cyanate group can be prepared by reacting a stoichiometric quantity of a maleic anhydride per amine group of a hydroxy(amino)aryl or a hydroxyarylaminoaryl compound in the presence of a suitable solvent then cyanating the resulting hydroxyaryl maleimide product.

Suitable maleic anhydrides include, for example, those represented by the formula

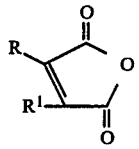

(III)

wherein R and R¹ are as hereinbefore defined.

Suitable maleic anhydrides include maleic anhydride, methyl maleic anhydride, mixtures thereof and the like. Most preferred as the maleic anhydride is maleic anhydride, per se.

Suitable hydroxy(amino)aryl and hydroxyarylaminoaryl compounds include, for example, those represented by the formulas

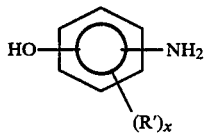

(IV)

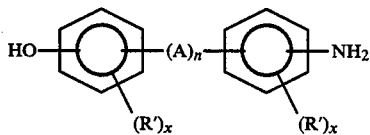

(V)

wherein R', A, n and x are as hereinbefore defined.

Suitable hydroxy(amino)aryl and hydroxyarylaminoaryl compounds include o-aminophenol; m-aminophenol; p-aminophenol; 2-methoxy-4-hydroxy-1-aminobenzene; 3,5-dimethyl-4-hydroxy-1-aminobenzene; 3-cyclohexyl-4-hydroxy-1-aminobenzene; 2,6-dibromo-4-hydroxy-1-aminobenzene; 5-butyl-4-hydroxy-1-aminobenzene; 3-phenyl-4-hydroxy-1-aminobenzene; 4-(1-(3-aminophenyl)-1-methylethyl)phenol; 4-(1-(4-aminophenyl)-1-methylethyl)phenol; 4-(1-(4-aminophenyl)ethyl)phenol; 4-(4-aminophenoxy)phenol; 4-((4-aminophenyl)thio)phenol; (4-aminophenyl)(4-hydroxyphenyl)methanone; 4-((4-aminophenyl)sulfonyl)phenol and 4-(1-(4-amino-3,5-dibromophenyl)-1-methylethyl)-2,6-dibromophenol.

Specific methods for preparing 2-(4'-hydroxyaryl)-2-(4'-aminoaryl)propanes suitable for use as the hydroxyarylaminoaryl compound are taught by U.S. Pat. No. 4,374,272 which is incorporated herein by reference.

Suitable solvents include aliphatic monocarboxylic acids such as acetic acid, propionic acid, mixtures thereof and the like. Most preferred as the solvent is acetic acid. The maleamic acid resulting from reaction of a maleic anhydride and a hydroxy(amino)aryl or hydroxyarylaminoaryl compound, typically in an inert solvent such as chloroform, toluene or dioxane, may be isolated then dehydrated in an aliphatic monocarboxylic acid to the corresponding phenolic functional maleimide. Alternately, the reaction may be performed in a single continuous step in the aliphatic monocarboxylic acid solvent. The product resulting from this reaction is a phenolic functional maleimide represented by the formulas

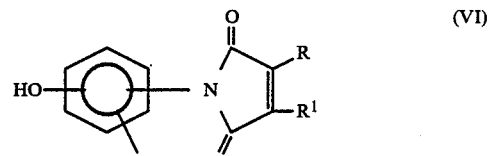

(VI)

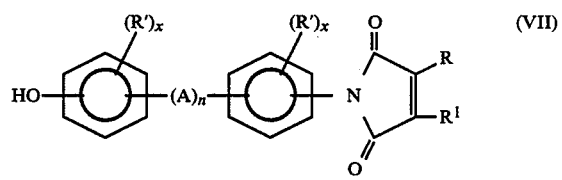

(VII)

wherein R, R¹, R', A, x and n are as hereinbefore defined.

Compounds which simultaneously contain both the maleimide group and the cyanate group are conveniently prepared by reacting a stoichiometric quantity or a slight stoichiometric excess (up to about 20 percent excess) of a cyanogen halide with a phenolic functional maleimide, such as those represented by formulas (VI) and (VII), in the presence of a stoichiometric quantity of a base material.

Suitable cyanogen halides include cyanogen bromide and cyanogen chloride. Alternately, the method of Martin and Bauer described in Organic Synthesis, Volume 61, pp. 35-68 (1983) and published by John Wiley and Sons can be used to generate the required cyanogen halide in situ from sodium cyanide and a halogen such as chlorine or bromine.

Suitable bases include both inorganic bases and tertiary amines such as sodium hydroxide, potassium hydroxide, triethylamine, mixtures thereof and the like. Most preferred as the base is triethylamine.

Suitable solvents include water, acetone, chlorinated hydrocarbons, ketones and the like. Most preferred solvents are acetone and methylene chloride. Reaction temperatures of from about −40° to about 60° C. are operable with temperatures of −20° to 25° C. being preferred.

Suitable materials having an average of more than one vicinal epoxy group per molecule which can be employed herein include, for example, the glycidyl ethers represented by the formulas

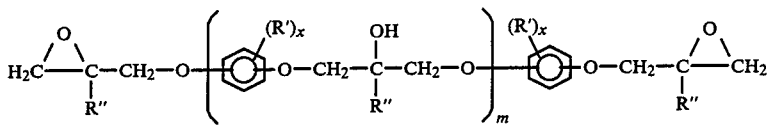

VIII.

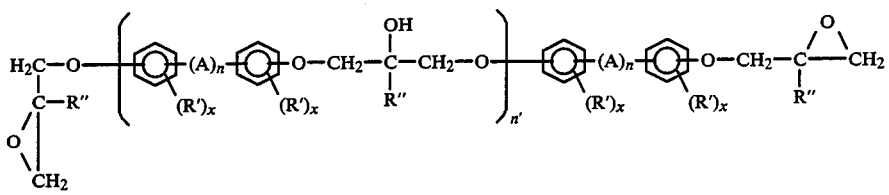

IX.

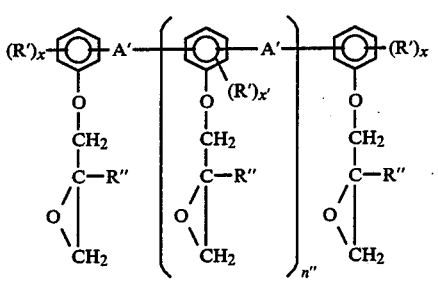

X.

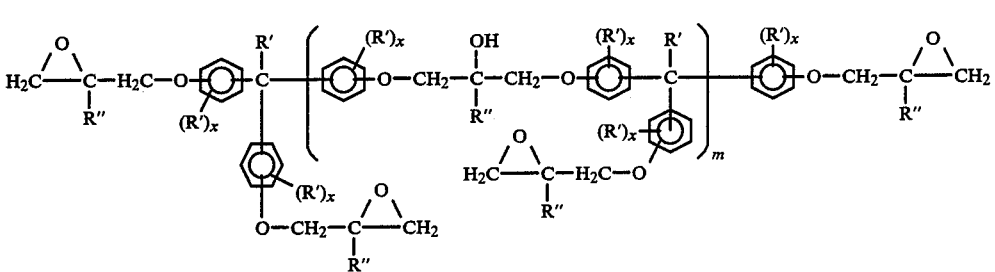

XI.

wherein A, R', x and n are as hereinbefore defined; each A' is independently a divalent hydrocarbon group having from 1 to about 6, preferably from 1 to about 4 carbon atoms or a

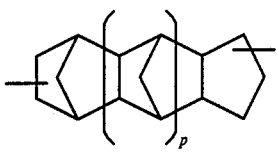

group; p has a value of from zero to about 10, preferably from zero to 3; each R" is independently hydrogen or an alkyl group having from 1 to about 4 carbon atoms; n' has a value of from about zero to about 30, preferably from about zero to about 5; n" has a value of from about 0.001 to about 6, preferably from about 0.01 to about 3 and x' has a value of 3.

Particularly suitable polyepoxides which can be employed herein include, for example, the diglycidyl ethers of resorcinol, bisphenol A, 3,3',5,5'-tetrabromobisphenol A, the triglycidyl ether of tris(hydroxyphenyl) methane, the polyglycidyl ether of a phenol-formaldehyde condensation product (novolac), the polyglycidyl ether of a dicyclopentadiene and phenol condensation product and the like. The polyepoxides can be used either alone or in combination.

The aforementioned polyepoxides represented by formulas (VIII), (IX), (X), and (XI) can be prepared by reaction of a diphenol or polyphenol with an epihalohydrin and a basic acting material. Said reaction generally involves two distinct steps: coupling reaction of the epihalohydrin and diphenol or polyphenol to provide a halohydrin intermediate and dehydrohalogenation reaction of the halohydrin intermediate to provide the glycidyl ether product. Suitable catalysts and reaction conditions for preparing polyepoxides are described in the *Handbook of Epoxy Resins* by Lee and Neville, McGraw-Hill (1967) which is incorporated herein by reference.

Suitable aromatic polycyanates which can be employed herein include, for example, those represented by the formulas (XII)

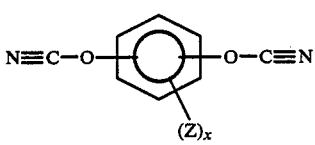

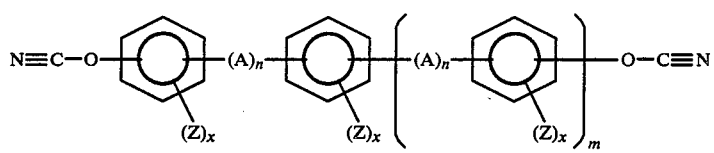
(XIII)

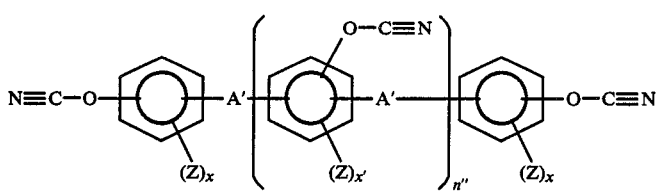
(XIV)

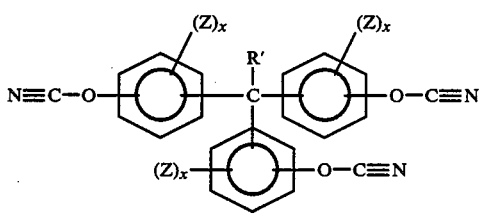
(XV)

wherein each Z is independently hydrogen, a hydrocarbyl or hydrocarbyloxy group having from 1 to about 4 carbon atoms, chlorine, bromine, or a —O—C≡N group; m has a value of from zero to about 100, preferably from zero to about 10 and A, A', R', x, x', n, n" and p are as hereinbefore defined.

Suitable aromatic polycyanates represented by formulas (XII), (XIII), (XIV) and (XV) include, for example, bis-phenol A dicyanate, the dicyanates of 4,4'-dihydroxydiphenyl oxide, resorcinol, 4,4'-thiodiphenol, 4,4'-sulfonyldiphenol, 3,3',5,5'-tetrabromobisphenol A, 2,2',6,6'-tetrabromobisphenol A, 3-phenyl bisphenol A, 4,4'-dihydroxybiphenyl, 2,2'-dihydroxybiphenyl, 2,2',4,4'-tetrahydroxydiphenyl methane, 2,2',6,6'-tetramethyl-3,3',5,5'-tetrabromobisphenol A, 3,3'-dimethoxybisphenol A, the tetracyanate of 2,2'4,4'-tetrahydroxydiphenylmethane.

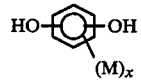
(XVI)

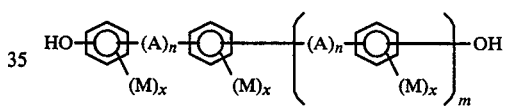
(XVII)

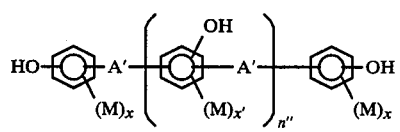
(XVIII)

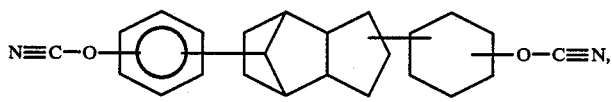

the tricyanate of tris(hydroxyphenyl)methane, the polycyanate of a phenolformaldehyde condensation product (novolac), the polycyanate of a dicyclopentadiene and phenol condensation product, and the like. The aromatic polycyanates may be used either alone or in any combination.

The aromatic polycyanates can be prepared by reacting a stoichiometric quantity or slight stoichiometric excess (up to about 20 percent excess) of a cyanogen halide with an aromatic polyphenol in the presence of a stoichiometric quantity of a base.

Suitable aromatic polyphenols include, for example, those represented by the formulas

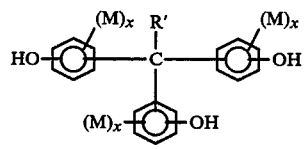
(XIX)

wherein A, A', R', x, x', n, n", m and p are as hereinbefore defined, and each M is independently a hydroarbyl or hydrocarbyloxy group having from 1 to about 4 carbon atoms, chlorine, bromine, a phenyl group or a hydroxyl group.

Suitable cyanogen halides include cyanogen bromide and cyanogen chloride. Alternately, the method of Martin and Bauer described in *Organic Synthesis*, Volume 61, pp. 35-68 (1983) and published by John Wiley and Sons can be used to generate the required cyanogen halide in situ from sodium cyanide and a halogen such as chlorine or bromide.

Suitable bases include both inorganic bases and tertiary amines such as sodium hydroxide, potassium hydroxide, triethylamine, mixtures thereof and the like. Most preferred as the base is triethylamine.

Suitable solvents include water, acetone, chlorinated hydrocarbons, ketones, and the like. Most preferred solvents are acetone and methylene chloride.

Reaction temperatures of from about −40 to about 60° C. are operable with temperatures of −20° to 25° C. being preferred.

Suitable polymaleimides which can be employed herein include, for example, those represented by the formulas

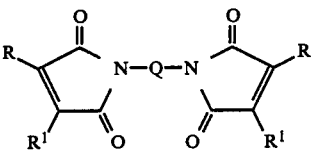
(XX)

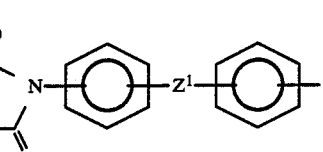
(XXI)

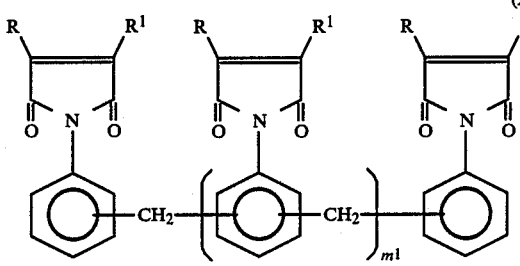
(XXII)

wherein R and $R^1$ are as hereinbefore defined, Q is a divalent hydrocarbly group having from 2 to about 12 carbon atoms and $m^1$ has a value of 0.001 to about 10; $Z^1$ is a direct bond, a divalent hydrocarbyl group having from 1 to about 5 carbon atoms, —S—, —S—S—, —O—,

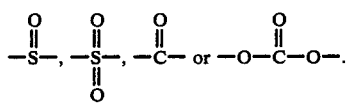

Typical polymaleimides represented by formulas XV, XVI and XVII include, N,N'-ethylenebismaleimide, N,N'-ethylenebis(2-methylmaleimide), N,N'-hexamethylene-bismaleimide, N,N'-(oxydi-p-phenylene)-bismaleimide, N,N'-(methylenedi-p-phenylene)bismaleimide, N,N'-(methylenedi-p-phenylene)bis(2-methylmaleimide), N,N'-(thiodi-p-phenylene)bismaleimide, N,N'-(sulfonyldi-m-phenylene)-bismaleimide, N,N'-(isopropylidenedi-p-phenylene)bis-maleimide, polymethylene polyphenylene polymaleimides and the like. The polymaleimides may be used either alone or in any combination.

The polymaleimides can be prepared by reacting a stoichiometric quantity of a maleic anhydride per amine group of a polyamine in the presence of a suitable solvent.

Suitable maleic anhydrides include those previously delineated herein.

Suitable polyamines which can be employed to prepare the polymaleimides include, for example, those represented by the formulas

$H_2N-Q-NH_2$ (XXIII)

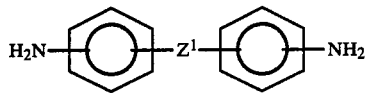
(XXIV)

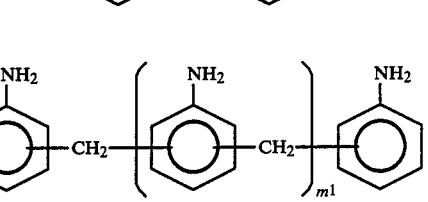
(XXV)

wherein Q, $Z^1$ and $m^1$ are as hereinbefore defined.

Suitable polyamines include 1,4-diaminobutane, dodecyl diamine, methylene dianiline, diaminodiphenyl ether, 2-methyl-4-ethyl-1,8-diaminooctane, aniline-formaldehyde condensation products, mixtures thereof and the like.

Suitable solvents include aromatic hydrocarbons, chlorinated hydrocarbons, N,N-dimethylformamide and the like. Most preferred solvents are N,N-dimethylformamide, chloroform and toluene. The polymaleamic acid resulting from reaction of a maleic anhydride and a polyamine may be isolated then dehydrated to the desired polymaleimide. Alternately, the reaction may be performed in a single continuous step. Detailed procedures for preparing polymaleimides can be found in U.S. Pat. No. 2,444,536 and U.S. Pat. No. 2,462,835 which are incorporated herein by reference.

Suitable polymerizable ethylenically unsaturated materials which can be employed herein include those represented by the formula

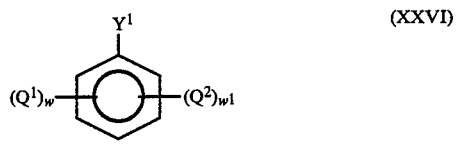
(XXVI)

wherein each $Q^1$ is independently hydrogen, a hydrocarbyl or hydrocarbyloxy group having from 1 to about 4 carbon atoms, a vinyl group, an allyl group, chlorine or bromine; each $Q^2$ is independently hydrogen or a hydrocarbyl or hydrocarbyloxy group having from 1 to about 4 carbon atoms; $Y^1$ is

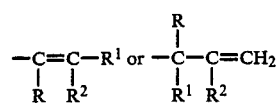

wherein R, $R^1$ abd $R^2$ is independently hydrogen or a hydrocarbyl group having from 1 to about 3 carbon atoms; and w and w¹ are each positive integers, the sum of which is 5.

Typically ethylenically unsaturated compounds represented by formula XXVI include, for example, styrene, alpha-methylstyrene, and chlorostyrene, bromostyrene, t-butylstyrene, p-methylstyrene, p-methoxystyrene, divinylbenzene, propylstyrene, chloro-alpha-methylstyrene, m-methylstyrene, o-methylstyrene, allylbenzene, methallylbenzene, p-allylstyrene, diallylbenzene, mixtures thereof and the like.

Equally preferred as the polymerizable ethylenically unsaturated material which can be employed include herein the acrylate esters represented by the formula

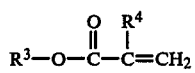  (XXVII)

wherein $R^3$ is a hydrocarbyl group having from 2 to about 25 carbon atoms and may be branched, cyclic or polycyclic and $R^4$ is hydrogen or a methyl group.

Typical acrylate esters represented by formula XXVII include ethyl acrylate, n-butyl acrylate, n-butyl methacrylate, sec-butyl acrylate, 2-ethylhexyl acrylate, 2-ethylhexyl methacrylate, n-dodecyl acrylate, cyclohexyl acrylate, methyl cyclohexyl acrylate, norbornyl acrylate, dicyclopentadiene acrylate, methyl dicyclopentadiene acrylate, mixtures thereof and the like.

Although less preferred, any other of the known polymerizable ethylenically unsaturated compounds can be employed herein either alone or in any combination. Typical of these compounds are acrylonitrile, diallylphthalate, vinyl chloride, vinyl bromide, vinyl acetate, vinyl naphthalene, the poly(ethoxy)acrylate of dicyclopentadiene, mixtures thereof and the like.

Compositions which comprise at least one thermosettable compound which simultaneously contains both a maleimide group and a cyanate group (I, II) may be cured (polymerized) by heating from 50° to about 350° C. or more, preferably by heating from 70° to 200° C. and optionally in the presence of 0.001 to 5 percent by weight of a suitable cyclization catalyst. Operable cyclization catalysts include those taught by U.S. Pat. Nos. 3,694,410 and 4,094,852. Most preferred cyclization catalysts are cobalt naphthenate and cobalt octoate. The quantity depends upon the particular cyclization catalyst, cure time, cure temperature and structure of the specific compound being cured.

Prepolymerization or B-staging of the compositions can be accomplished by using lower temperatures and/or shorter curing times. Curing of the thus formed prepolymerized or B-staged resin can then be completed at a later time or immediately following prepolymerization or B-staging by increasing the temperature and/or curing time.

The cured (polymerized) products prepared from at least one thermosettable compound which simultaneously contain both a maleimide group and a cyanate group can posses a complex variety of curing structures including the cyanate group homopolymerization structure

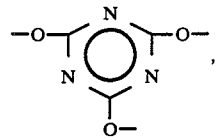

the maleimide group homopolymerization structure

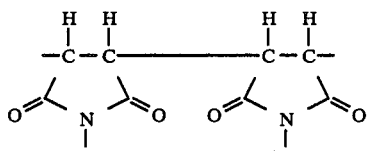

and cyanate group and maleimide group copolymerization structures such as, for example

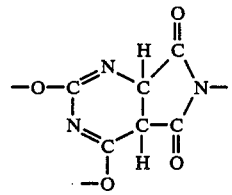

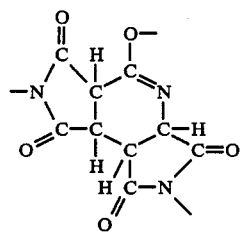

Compositions which comprise at least one thermosettable compound which simultaneously contains both a maleimide group and a cyanate group (I, II) and at least one compound selected from the group consisting of an aromatic polycyanate, (XII, XIII, XIV, XV), a polymaleimide (XX, XXI, XXII), a polyepoxide (VIII, IX, X, XI) or a polymerizable ethylenically unsaturated material (XXVI, XXVII) may be cured (copolymerized) by heating from 50° to about 350° C. or more, preferably from 70° to 200° C. and, optionally, in the presence of 0.001 to 5 percent of a suitable cyclization catalyst and, optionally, 0.001 to 3 percent of a suitable free radical forming catalyst.

Suitable cyclization catalysts include those previously delineated herein while suitable free radical forming catalysts include the organic peroxides, hydroperoxides, azo compounds and diazo compounds. Most preferred free radical forming catalysts include t-butyl peroxybenzoate, azobisiosbutyronitrile, dicumylperoxide and di-t-butylperoxide. The quantity depends upon the particular free radical forming catalyst, cure temperature, cure time and the particular compounds being copolymerized.

Prepolymerization or B-staging of the compositions can be accomplished as was previously described.

The cured (copolymerized) products possess a complex variety of curing structures which depend, in part, upon the amounts and types of compounds being copolymerized, cure time, cure temperature, presence or absence of a cyclization catalyst, presence or absence of a free radical forming catalyst and other known variables.

Compositions which contain at least one thermosettable compound which simultaneously contains both a maleimide group and a cyanate group (I, II) and either an aromatic polycyanate (XII, XIII, XIV, XV) or a polymaleimide (XX, XXI, XXII) or both can copolymerize to produce the aforementioned curing structures delineated for thermosettable compounds which simultaneously contain both a maleimide group and a cyanate group. It should be noted, however, that the relative mole ratio of cyanate groups to maleimide groups can influence the amounts of the various curing structures in the cured product. For example, a large excess of cyanate groups, provided by using an aromatic polycyanate in the copolymerizable composition, increases the amount of triazine during structure in the cured product.

Compositions which contain at least one thermosettable compound which simultaneously contains both a maleimide group and a cyanate group (I, II) and a polyepoxide (VIII, IX, X, XI) possess complex curing structures including those derived from copolymerization reaction of the cyanate group and the glycidyl ether group

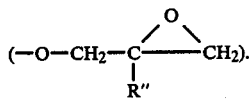

Compositions which contain at least one thermosettable compound which simultaneously contains both a maleimide group and a cyanate group (I, II) and a polymerizable ethylenically unsaturated material (XXVI, XXVII) can possess curing structures derived from copolymerization reaction of the maleimide group and the polymerizable ethylenically unsaturated group, from copolymerization reaction of the maleimide group and the cyanate group, as well as from copolymerization reaction of the cyanate group and the polymerizable ethylenically unsaturated group. Additionally present may be curing structures derived from homopolymerization of the polymerizable ethylenically unsaturated groups, from homopolymerization of the maleimide groups, as well as from homopolymerization of the cyanate groups.

The terms homopolymerization and copolymerization are also meant to include both dimerization and oligomerization.

The compositions which comprise at least one thermosettable compound which simultaneously contains both a maleimide group and a cyanate group (formulas I, II) and at least one compound from the group consisting of an aromatic polycyanate (formulas XII, XIII, XIV, XV), a polymaleimide (formulas XX, XXI, XXI), a polyepoxide (formulas VIII, IX, X, XI) or a polymerizable ethylenically unsaturated material (formulas XXVI, XXVII) may be copolymerized either simultaneously or in stages.

In a preferred process of the present invention, a thermosettable compound which simultaneously contains both a maleimide group and a cyanate group (formulas I, II) and a polymerizable ethylenically unsaturated material are first copolymerized in the presence of 0.001 to 2 percent of a suitable free radical forming catalyst and at a suitable reaction temperature while in solution in an aromatic polycyanate (formulas XII, XIII, XIV, XV). Operable free radical forming catalysts are as hereinbefore described. Suitable reaction temperatures are from about 65° C. to about 125° C. The compound which simultaneously contains both a maleimide group and a cyanate group and the polymerizable ethylenically unsaturated material may first be mixed to form a solution which is then added to the polycyanate. Alternately, the polymerizable ethylenically unsaturated material may be added to a solution of the compound which simultaneously contains both a maleimide group and a cyanate group and the polycyanate. The product resulting from this copolymerization is a copolymer of the polymerizable ethylenically unsaturated material with the maleimide groups of the compound which simultaneously contains both a maleimide group and a cyanate group dissolved in or mixed with a polycyanate. This product may be cured (homopolymerized) as previously described herein or copolymerized, for example, with a polyepoxide, as previously described herein.

As a specific example, copolymerization of styrene and 3-(2,5-dihydro-2,5-dioxo-1H-pyrrol-1-yl)phenyl cyanate in the presence of a free radical forming catalyst while in solution in bisphenol A dicyanate provides a copolymer of the following structure dissolved in or mixed with the bisphenol A dicyanate:

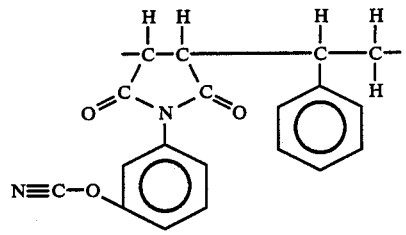

Depending on the amounts of the styrene and 3-(2,5-dihydro-2,5-dioxo-1H-pyrrol-1-yl)phenyl cyanate used, significant amounts of homopolymer of either of the aforementioned compounds may also be present.

In another preferred process of the present invention, a thermosettable compound which simultaneously contains both a maleimide group and a cyanate group (I, II) and a polymerizable ethylenically unsaturated material are copolymerized in the presence of 0.001 to 3 percent of a suitable free radical forming catalyst and at a suitable reaction temperature optionally in the presence of an inert solvent. The product resulting from this copolymerization is a copolymer of the ethylenically unsaturated material with the maleimide groups of the compound which simultaneously contains both a maleimide group and a cyanate group. This product may be cured (homopolymerized) as previously described herein or copolymerized, for example, with a polycyanate and/or a polyepoxide, as previously described herein.

In those instances where R' is chlorine or bromine (formulas I, II, VIII, IX, X, XI, XV), Z is chlorine or bromine (formulas XII, XIII, XIV, XV) and/or $Q^1$ is chlorine or bromine (formula XXVI) the halogen(s) are incorporated into the copolymers by the polymerization of monomer(s) containing said group(s). Furthermore, the halogen groups can be incorporated into the copolymers in a specific location within the polymer structure. As a specific example, copolymerization of 3-(2,5-dihydro-2,5-dioxo-1H-pyrrol-1-yl)phenyl cyanate, bisphenol A dicyanate and chlorostyrene provide a copolymer wherein $Q^1$ is chlorine and $Q^1$ is specifically present only on the styrene aromatic rings within the polymer chains. Said halogen containing copolymers are useful as fire retardant polymers.

If desired, the compositions can contain fillers, pigments, dyes, reinforcing materials, other additives and the like.

The compositions of the present invention are useful in the preparation of castings, structural or electrical laminates or composites, coatings, and the like.

Laminates or composites can be prepared from the compositions of the present invention employing any facing and/or reinforcing materials such as, for example, metallic sheets, woven or mat materials, such as fiberglass, graphite, asbestos, aramids, carbon combinations thereof and the like.

The following examples are illustrative of the invention but are not to be construed as to limiting the scope thereof in any manner.

EXAMPLE 1

A. Synthesis of a Phenolic Functional Maleimide

A 54.57 gram portion of m-aminophenol (0.50 mole) and 650 milliliters of acetic acid were added to a reactor and maintained under a nitrogen atmosphere with stirring. The stirred solution was maintained at 25° C., then 49.03 grams of maleic anhydride (0.50 mole) dissolved in 100 milliliters of acetic acid was added to the reactor and heating to 110° C. commenced. The 110° C. reaction temperature was maintained for 14 hours (50,400 s), then the product was dried under vacuum by rotary evaporation at 120° C. for 30 minutes (1800 s) to a dark brown solid. The crude product was extracted with two 250 milliliter portions of o-dichlorobenzene at 120° C. The combined extracts were maintained at 2° C. for 24 hours (86,400 s) then the light yellow orange colored crystalline product was recovered by filtration and dried under vacuum at 60° C. for 24 hours (86,400 s) to provide 35.0 grams of N-(3-hydroxyphenyl) maleimide. Infrared spectrophotometric analysis of a film sample of the product confirmed the product structure.

B. Preparation of 3-(2,5-dihydro-2,5-dioxo-1H-pyrrol-1-yl)phenyl cyanate

A 34.05 gram portion of N-(3-hydroxyphenyl)maleimide (0.18 mole), 20.02 grams of cyanogen bromide (0.189 mole) and 300 milliliters of acetone were added to a reactor and maintained under a nitrogen atmosphere with stirring. The stirred solution was cooled to $-10°$ C. then 18.31 grams of triethylamine (0.1809 mole) was added to the reactor over a fifteen minute (900 s) period and so as to maintain the reaction temperature at $-5°$ to $-4°$ C. After completion of the triethylamine addition, the reactor was maintained at $-5°$ to $-3°$ C. for an additional thirty minutes (1800 s), followed by addition of the reactor contents to 1500 milliliters of deionized water. After five minutes (300 s), the water and product mixture was multiply extracted with three 100 milliliter volumes of methylene chloride. The combined methylene chloride extract was washed with 500 milliliters of 0.05 percent aqueous hydrochloric acid followed by washing with 500 milliliters of deionized water then drying over anhydrous sodium sulfate. The dry methylene chloride extract was filtered and solvent removed by rotary evaporation under vacuum for 60 minutes at 60° C. 3-(2,5-dihydro-2,5-dioxo-1H-pyrrol-1-yl)phenyl cyanate (34.25 grams) was recovered in 88.9 percent yield as a light tan colored powder. Infrared spectrophotometric analysis of a film sample of the product confirmed the product structure (disappearance of phenolic hydroxyl absorbance, appearance of cyanate absorbance at 2232 and 2274 cm$^{-1}$, maintenance of maleimide carbonyl absorbance at 1714 cm$^{-1}$).

C. Mass Spectroscopic Analysis of 3-(2,5-dihydro-2,5-dioxo-1H-pyrrol-1-yl)phenyl cyanate 3-(2,5-dihydro-2,5-dioxo-1H-pyrrol-1-yl)phenyl cyanate from B above was analyzed by mass spectroscopy using a Finnigan 4500 MS and direct probe introduction of the sample. Sample ions were observed at the ambient temperature (150° C.) of the ion source. The molecular ion observed at m/z 214 confirmed the product structure.

EXAMPLE 2

A. Preparation of 4-(1-(4-aminophenyl)-1-methylethyl) phenol

A mixture of 134.0 grams (1.0 mole) of p-isopropenylphenol and 186.0 grams (2.0 moles) of aniline was stirred and heated to 150° C. To the mixture was added 5.0 grams of a solution obtained by adding 1.28 grams of 10% hydrochloric acid to 93 grams of aniline and stirring the mixture well. The reaction was carried out for 3.0 hours (10,800 s) at the 150° C. reaction temperature. The reaction product was cooled to 120° C. then 350 milliliters of toluene was added. The product was then cooled to 25° C. and the solid precipitated product was recovered by filtration. The crude product was slurried into 350 milliliters of methanol and heated to a reflux then maintained for 15 minutes (900 s). After cooling, the product was recovered by filtration and dried under vacuum to yield 4-(1-(4-aminophenyl)-1-methylethyl)-phenol as a white powder.

B. Synthesis of a Phenolic Functional Maleimide

A 45.46 gram portion of 4-(1-(4-aminophenyl)-1-methylethyl)phenol (0.20 mole) and 500 milliliters of acetic acid were added to a reactor and maintained under a nitrogen atmosphere with stirring. The stirred solution was maintained at 25° C., then 19.61 grams of maleic anhydride (0.20 mole) dissolved in 100 milliliters of acetic acid was added to the reactor and heating to a reflux commenced. The 126° C. reflux temperature was maintained for 15 hours (54,000 s), then the product was dried under vacuum by rotary evaporation at 100° C. for 60 minutes (3600 s). The crude product was dissolved in 250 milliliters of o-dichlorobenzene at 120° C. and then cooled to 25° C. The light yellow colored solution was decanted away from a brown colored oil layer and dried under vacuum by rotary evaporation at 100° C. for 60 minutes (3600 s) to provide 31.4 grams of 4-(1-(4-(2,5-dihydro-2,5-dioxo-1H-pyrrol-1-yl)phenyl)-1-methylethyl)phenol as a bright yellow colored powder. Infrared spectrophotometric analysis of a film sample of the product confirmed the product structure.

C. Preparation of 4-(1-(4-(2,5-dihydro-2,5-dioxo-1H-pyrrol-1-yl)phenyl)-1-methylethyl)phenyl cyanate A 21.70 gram portion of 4-(1-(4-(2,5-dihydro-2,5-dioxo-1H-pyrrol-1-yl)phenyl)1-methylethyl)phenol (0.1037 mole), 11.53 grams of cyanogen bromide (0.1089 mole) and 250 milliliters of acetone were added to a reactor and maintained under a nitrogen atmosphere with stirring. The stirred solution was cooled to −5° C. then 10.55 grams of triethylamine (0.1043 mole) was added to the reactor over a eight minute (480 s) period and so as to maintain the reaction temperature at −5° to −3° C. After completion of the triethylamine addition, the reactor was maintained at −5° to −3° C. for an additional 37 minutes (2220 s), followed by addition of the reactor contents to 1500 milliliters of deionized water. After 5 minutes (300 s), the water and product mixture was multiply extracted with three 100 milliliter volumes of methylene chloride. The combined methylene chloride extract was washed with 500 milliliters of 0.05 percent aqueous hydrochloric acid followed by washing with 500 milliliters of deionized water then drying over anhydrous sodium sulfate. The dry methylene chloride extract was filtered and solvent removed by rotary evaporation under vacuum for 30 minutes (1800 s) at 90° C. 4-(1-(4-(2,5-dihydro-2,5-dioxo-1H-pyrrol-1-yl)phenyl)-1-methylethyl)phenyl cyanate (22.2 grams) was recovered in 91.4 percent yield as a light amber colored oil. Infrared spectrophotometric analysis of a film sample of the product confirmed the product structure (disappearance of phenolic hydroxyl absorbance, appearance of cyanate absorbance at 2242 and 2271 cm$^{-1}$, maintenance of maleimide carbonyl absorbance at 1722 cm$^{-1}$).

D. Preparation of Bisphenol A Dicyanate

A 456.60 gram portion of 4,4′-isopropylidene diphenol (2.00 moles), 444.91 grams of cyanogen bromide (4.20 moles) and 1,100 milliliters of acetone were added to a reactor and maintained under a nitrogen atmosphere with stirring. The stirred solution was cooled to −5° C., then 406.82 grams of triethylamine (4.02 moles) was added to the reactor over a 60 minute (3600 s) period and so as to maintain the reaction temperature at −5° to −3° C. After completion of the triethylamine addition, the reactor was maintained at −5° to −3° C. for an additional twenty-five minutes (1500 s) followed by addition of the reactor contents to 1.5 gallons (5.685) of deionized water. After 5 minutes (300 s), the water and product mixture was multiply extracted with three 500 milliliter volumes of methylene chloride. The combined methylene chloride extract was washed with 500 milliliters of 0.05 percent by weight aqueous hydrochloric acid followed by washing with 500 milliliters of deionized water, then drying over anhydrous sodium sulfate. The dry methylene chloride extract was filtered and solvent removed by rotary evaporation under vacuum for 60 minutes (3600 s) at 100° C. Bisphenol A dicyanate (545.8 grams) was recovered in 98.1 percent yield as a light tan colored, crystalline solid. Infrared spectrophotometric analysis of a film sample of the product confirmed the product structure (disappearance of phenolic hydroxyl absorbance, appearance of cyanate absorbance).

E. Preparation and Copolymerization of 4-(1-(4-(2,5-dihydro-2,5-dioxo-1H-pyrrol-1-yl)phenyl)-1-methylethyl)phenyl cyanate and Bisphenol A Dicyanate Solution A 22.2 gram portion of 4-(1-(4-(2,5-dihydro-2,5-dioxo-1H-pyrrol-1-yl)phenyl-1-methylethyl)phenyl cyanate from C above and 88.8 grams of bisphenol A dicyanate from D above were combined and heated to 100° C. with stirring to form a solution. The solution was cooled to 50° C., then 0.11 gram of cobalt naphthenate (6.0 percent active) was mixed in. This solution was reheated to 100° C., filtered, then poured into a ⅛ inch (0.3175 cm) mold made from a pair of glass plates and then placed in an oven and maintained at 125° C. for 2 hours (7200 s), 177° C. for 4 hours (14,400 s), 200° C. for 4 hours (14,400 s), then 250° C. for 2 hours (7200 s). The transparent, light amber colored, clear, unfilled casting was demolded and used to prepare test pieces for tensile and flexural strength, flexural modulus, percent elongation and average Barcol hardness (934-1 scale determinations). Mechanical properties of tensile and flexural test pieces were determined using an Instron machine with standard test methods (ASTM D-638 and D-790). The results are reported in Table I.

COMPARATIVE EXPERIMENT A

Homopolymerization of Bisphenol A Dicyanate

A 200.0 gram portion of bisphenol A dicyanate prepared using the method of Example 2-D was heated to 100° C. to form a solution, cooled to 50° C., then 0.20 gram of cobalt naphthenate (6.0 percent active) was added. This solution was reheated to 100° C., filtered, then poured into a ⅛ inch (0.3175 cm) mold and cured using the method of Example 2-E. The transparent, light amber colored, clear, unfilled casting was demolded and used to prepare test pieces which were tested using the method of Example 2-E. The results are reported in Table I.

TABLE I

| | Example 1-E | Comparative Experiment A |
|---|---|---|
| Barcol Hardness | 49 | 48 |
| Tensile Strength, psi/kPa | 13,590/93,701 | 13,080/90,184 |
| Elongation, % | 3.12 | 3.26 |
| Flexural Strength, psi/kPa | 22,348/154,085 | 19,176/132,215 |
| Flexural Modulus, psi/kPa | 571,000/3,936,947 | 555,000/3,826,630 |

EXAMPLE 3

Copolymerization of 2-Ethylhexyl Acrylate and 3-(2,5-dihydro-2,5-dioxo-1H-pyrrol-1-yl)phenyl cyanate in a Bisphenol A Dicyanate Solution A 175.0 gram (81.28 percent by weight, pbw) portion of bisphenol A dicyanate prepared using the method of Example 2-D and a 8.0 gram (3.72 pbw) portion of 3-(2,5-dihydro-2,5-dioxo-1H-pyrrol-1-yl)phenyl cyanate prepared using the method of Example 1-B were added to a reactor and maintained under a nitrogen atmosphere. The reactor contents were heated to a 110° C. solution then stirring commenced and dropwise addition of 32.29 grams (15.0 pbw) of 2-ethylhexyl acrylate and 0.43 gram of azobisisobutyronitrile as a solution commenced and was completed over a fifteen minute (900 s) period. After an additional 80 minutes (4800 s) of reaction at the 110° C. reaction temperature, the product was recovered as a slightly hazy, light amber colored solution. A portion (0.2 grams) of the copoly(2-ethylhexyl acrylate and 3-(2,5-dihydro-2,5-dioxo-1H-pyrrol-1-yl)phenyl cyanate) in bisphenol A dicyanate solution was analyzed by gel permeation chromatography using polystyrene standards. The weight average molecular weight of the 2-ethylhexyl acrylate and 3-(2,5-dihydro-2,5-dioxo-1H-pyrrol-1-yl)phenyl cyanate copolymer portion of the solution was 11,789 and the polydispersity ratio was 8.98.

EXAMPLE 4

A. Copolymerization of 2-Ethylhexyl Acrylate and 3-(2,5-dihydro-2,5-dioxo-1H-pyrrol-1-yl)phenyl cyanate in a Bisphenol A Dicyanate Solution A 180.0 gram (80 percent by weight, pbw) portion of bisphenol A dicyanate prepared using the method of Example 2-D and an 11.25 gram (5 pbw) portion of 3-(2,5-dihydro-2,5-dioxo-1H-pyrrol-1-yl)phenyl cyanate prepared using the method of Example 1-B were added to a reactor and maintained under a nitrogen atmosphere. The reactor contents were heated to a 110° C. solution. Then stirring commenced and dropwise addition of 33.75 grams (15 pbw) of 2-ethylhexyl acrylate and 0.45 gram of azobisisobutyronitrile as a solution commenced over a 35 minute (2100 s) period. After an additional 120 minutes (7200 S) of reaction at the 110° C. reaction temperature, the product was recovered as a hazy, light amber colored solution.

B. Polymerization of Copoly(2-ethylhexyl acrylate and 3-(2,5-dihydro-2,5-dioxo-1H-pyrrol-1-yl)phenyl cyanate) in Bisphenol A Dicyanate Solution A 210.0 gram portion of copoly(2-ethylhexyl acrylate and 3-(2,5-dihydro-2,5-dioxo-1H-pyrrol-1-yl)phenyl cyanate) in bisphenol A dicyanate from A above was heated to 50° C., then 0.21 gram of cobalt naphthenate (6.0 percent active) was added. This solution was heated to 100° C., filtered, then poured into a ⅛ inch (0.3175 cm) mold and cured using the method of Example 2-E. The opaque, light amber colored, unfilled casting was demolded and used to prepare test pieces which were tested using the method of Example 2-E. A pair of heat distortion temperature test pieces were also prepared from the casting and heat distortion temperature was determined using an Aminco Plastic Deflection Tester (American Instrument Co.) with standard methods (ASTM D-648 modified). The results are reported in Table II.

TABLE II

| Barcol Hardness | 36 |
|---|---|
| Heat Distortion Temperature, °F./°C. | 455/235 |
| Tensile Strength psi,kPa | 10,525/72,568 |
| Elongation, % | 4.49 |
| Flexural Strength, psi/kPa | 17,516/120,769 |
| Flexural Modulus, psi/kPa | 422,000/2,909,606 |

EXAMPLE 5

Polymerization of 3-(2,5-dihydro-2,5-dioxo-1H-pyrrol-1-yl)phenyl cyanate; Bisphenol A Dicyanate and Styrene Solution A 9.25 gram portion of 3-(2,5-dihydro-2,5-dioxo-1H-pyrrol-1-yl)phenyl cyanate (4.15 pbw) prepared using the method of Example 1-B; 168.75 grams of bisphenol A dicyanate (75.67 pbw) prepared using the method of Example 2-D; and 45.0 grams of styrene (20.18 pbw) were combined and heated to 100° C. with stirring to form a solution. The solution was cooled to 60° C., then 0.22 gram of cobalt naphthenate (6.0 percent active) was mixed in. This solution was reheated to 100° C., filtered, then poured into a ⅛ inch (0.3175 cm) mold and cured using the method of Example 2-E. The transparent, light amber colored, clear, unfilled casting was demolded and used to prepare test pieces which were evaluated using the method of Example 2-E. A pair of heat distortion temperature test pieces were also prepared and tested using the method of Example 4-B. The results are reported in Table III.

TABLE III

| Barcol Hardness | 51 |
|---|---|
| Heat Distortion Temperature, °F./°C. | 379.9/193.3 |
| Tensile Strength, psi/kPa | 12,909/89,005 |
| Elongation, % | 2.81 |
| Flexural Strength, psi/kPa | 18,476/127,388 |
| Flexural Modulus, psi/kPa | 522,200/3,600,465 |

EXAMPLE 6

Homopolymerization of 3-(2,5-dihydro-2,5-dioxo-1H-pyrrol-1-yl)phenyl cyanate

A portion (1.0 gram) of 3-(2,5-dihydro-2,5-dioxo-1H-pyrrol-1-yl)phenyl cyanate from Example 1-B, 0.0001 gram of cobalt naphthenate (6.0 percent active) and 3.0 grams of acetone were thoroughly mixed to form a solution. The solution was devolatilized and then cured using the method of Example 2-E. A portion (9.54 milligrams) of the resulting transparent, light amber colored film was analyzed by thermogravimetric analysis (TGA). Weight loss was recorded as a function of temperature at a 10° C. per minute rate of increase in a stream of nitrogen flowing at 35 cubic centimeters per minute. As a comparative experiment, a portion (9.80 milligrams) of the homopolymerized bisphenol A dicyanate of Comparative Experiment A was also analyzed by TGA. The results are reported in Table IV.

TABLE IV

| Sample Designation | Weight Loss % | | | | | | |
|---|---|---|---|---|---|---|---|
| | 100° C. | 300° C. | 350° C. | 400° C. | 450° C. | 500° C. | 700° C. |
| Example 6 | 0 | 1.0 | 1.2 | 17 | 26.2 | 32 | 49.5 |
| Comparative Experiment A | 0.2 | 1.5 | 2.0 | 3.6 | 30.5 | 49 | 62.2 |

EXAMPLE 7

Sets of four flexural strength test pieces prepared from the castings of Examples 2-E, 4-5 and Comparative Experiment A were weighed, then immersed in deionized water contained in individual jars and maintained at 92° C. The test pieces were weighed at the indicated intervals and the percent weight gain calculated as follows: 100 [(exposed weight - initial weight)/initial weight]. An average of the percent weight gain was then calculated. After a total of 94 hours of exposure to the 92° C. deionized water, the flexural strength, flexural modulus and average Barcol hardness were determined using the method of Example 2-E. The results are reported in Table V.

TABLE V

| | SAMPLE DESIGNATION | | | |
|---|---|---|---|---|
| | Example 2-E | Example 4-B | Example 5 | Comparative Experiment A |
| Flexural Strength, psi/kPa | | | | |
| initial | 22,348/154,085 | 17,516/120,769 | 18,476/127,388 | 19,176/132,215 |
| exposed | 17,566/121,114 | 15,266/105,256 | 18,667/128,705 | 19,946/137,524 |
| percent change | −21.4 | −12.85 | +1.03 | +4.02 |
| Flexural Modulus, psi/kPa | | | | |
| initial | 571,000/3,936,931 | 422,000/2,909,606 | 522,000/3,599,086 | 555,000/3,826,614 |
| exposed | 620,000/4,274,776 | 411,000/2,833,763 | 602,000/4,150,670 | 629,000/4,336,829 |
| percent change | +8.58 | −2.61 | +15.33 | +13.33 |
| Barcol Hardness | | | | |
| initial | 49 | 36 | 51 | 48 |
| exposed | 47 | 35 | 51 | 46 |
| percent change | −4.08 | −2.78 | none | −4.17 |
| Percent Weight Gain | | | | |
| 24 hours of exposure | 1.64 | 1.36 | 0.89 | 1.93 |
| 48 hours of exposure | 1.98 | 1.49 | 1.04 | 2.37 |
| 72 hours of exposure | 2.18 | 1.57 | 1.12 | 2.57 |
| 94 hours of exposure | 2.28 | 1.62 | 1.16 | 2.69 |

COMPARATIVE EXPERIMENT B

A clear, unfilled ⅛ inch (0.3175 cm) casting of a bis-maleimide-triazine resin (BT 2600 Resin, Mitsubishi Gas Chemical Co., Inc.) was prepared using the method of Example 2-E with the exception that cobalt acetoacetonate catalyst was used to provide 131 ppm cobalt and curing was completed at 175° C. for 1 hour (3600 s) and 225° C. for 2 hours (7200 s). Flexural strength and flexural modulus of test pieces prepared from the transparent, amber colored casting were evaluated using the method of Example 2-E. A second set of flexural strength test pieces were prepared and immersed in 92° C. deionized water then evaluated using the method of Example 7. The results are reported in Table VI and may be compared with the results reported in Example 7.

TABLE VI

| Flexural Strength, psi/kPa | |
|---|---|
| initial | 16,200/111,696 |
| exposed | 13,130/90,529 |
| percent change | −18.95 |
| Flexural Modulus, psi/kPa | |
| initial | 673,000/4,640,200 |
| exposed | 760,000/5,240,048 |
| percent change | +12.93 |
| Barcol Hardness | |
| initial | 60 |
| exposed | 56 |
| percent change | −6.67 |
| Percent Weight Gain | |
| after 24 hours of exposure | 1.31 |
| after 48 hours of exposure | 1.66 |
| after 72 hours of exposure | 1.87 |
| after 94 hours of exposure | 2.04 |

I claim:

1. The product resulting from polymerizing a composition comprising at least one thermosettable compound which contains simultaneously in the same molecule only one maleimide or substituted maleimide group which groups are represented by the formula

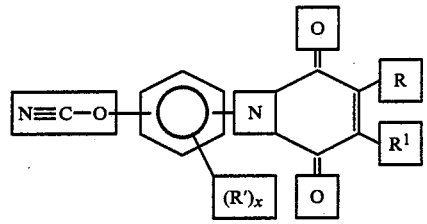

wherein each R and $R^1$ is independently hydrogen or a hydrocarbyl group having from 1 to about 3 carbon atoms; and only one cyanate group.

2. The product of claim 1 wherein said compound is represented by the formulas

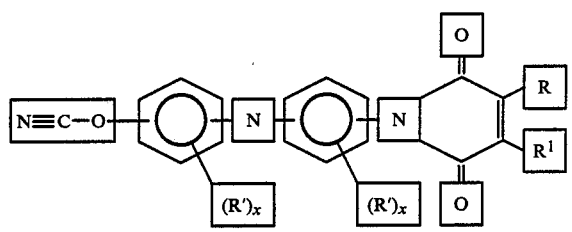

wherein each R and $R^1$ is independently hydrogen or a hydrocarbyl group having from 1 to about 3 carbon atoms; each R' is independently hydrogen, a hydrocarbyl or hydrocarbyloxy group having from 1 to about 10 carbon atoms or a halogen atom; A is a divalent hydrocarbon group having from 1 to about 10 carbon atoms, —O—, —CO—, —S—, —S—S—, —SO—, —SO₂— or —O—CO—O—; n has a value of zero or 1 and x has a value of 4.

3. The product of claim 2 wherein each R' is independently hydrogen, a hydrocarbyl or hydrocarbyloxy group having from 1 to about 4 carbon atoms or a halogen atom; and when A is present and is a divalent hydrocarbyl group, it has from 1 to about 4 carbon atoms.

4. The product of claim 3 wherein said compound is 3-(2,5-dihydro-2,5-dioxo-1H-pyrrol-1-yl)phenyl cyanate or 4-(1-(4-(2,5-dihydro-2,5-dioxo-1H-pyrrol-1-yl)phenyl)-1-methylethyl)phenyl cyanate.

* * * * *

UNITED STATES PATENT AND TRADEMARK OFFICE
CERTIFICATE OF CORRECTION

PATENT NO. : 4,731,426

DATED : March 15, 1988

INVENTOR(S) : Robert E. Hefner, Jr.

It is certified that error appears in the above-identified patent and that said Letters Patent is hereby corrected as shown below:

Col. 1, line 50; change "!he" to --the--.

Col. 2, line 9; change "preferablY" to --preferably--.

Col. 3, line 6; change "dioxo-1H-pyrrol-1-yl)thio)phenyl" to --dioxo-1H-pyrrol-1-yl)phenyl)thio)phenyl--.

Col. 3, line 7; change "dihydro-2,5-dioxo-1yl)benzoyl)phenyl" to --dihydro-2,5-dioxo-1H-pyrrol-1-yl)benzoyl)phenyl--.

Col. 3, line 10; change "2,5-dioxo-1H-pyrrol-1-yl)-1-methylethyl)phenyl" to --2,5-dioxo-1H-pyrrol-1-yl)phenyl)-1-methylethyl)phenyl --

Col. 3, line 12; delete "dihydro-2,5".

Col. 3, line 16; change "pyarol" to --pyrrol--.

Col. 7, lines 45-55, the 2nd formula; insert a circle inside the last 6-membered ring.

Col. 8, line 63; change "hydroarbyl" to --hydrocarbyl--.

Col. 9, line 5; change "bromide" to --bromine--.

Col. 9, line 47; change "hydrocarbly" to --hydrocarbyl--.

Col. 10, line 67; change "wherein R, $R^1$ abd" to -- wherein each R, $R^1$ and --

UNITED STATES PATENT AND TRADEMARK OFFICE
CERTIFICATE OF CORRECTION

PATENT NO. : 4,731,426

DATED : March 15, 1988

INVENTOR(S) : Robert E. Hefner, Jr.

It is certified that error appears in the above-identified patent and that said Letters Patent is hereby corrected as shown below:

Col. 11, line 5; delete "and".

Col. 11, line 11; change "blenzene" to --benzene--.

Col. 13, line 18; change "during" to --curing--.

Col. 13, line 57; change 2nd occurrence of "XXI" to --XXII--.

Col. 16, line 67; change "dioxo-1H-pyrrol-1-yl)phenyl)1-methylethyl)phenol" to --dioxo-1H-pyrrol-1-yl)phenyl)-1-methylethyl)phenol--.

Col. 17, line 42; change "(5.685)" to --(5.685 1)--.

Col. 20, line 57; change "4-5" to -- 4-B, 5 --.

Col. 22, lines 42-50, Formula; change the 2nd occurrence of "N" to --$(A)_n$--.

Signed and Sealed this

Twenty-second Day of November, 1988

Attest:

DONALD J. QUIGG

Attesting Officer      Commissioner of Patents and Trademarks